US010529069B2

(12) United States Patent
Nakamura (10) Patent No.: US 10,529,069 B2
(45) Date of Patent: Jan. 7, 2020

(54) IMAGE INSPECTION APPARATUS AND IMAGE INSPECTION APPARATUS CONTROL PROGRAM (71) Applicant: KONICA MINOLTA, INC., Chiyoda-ku, Tokyo (JP)

(72) Inventor: Masao Nakamura, Tachikawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/032,308

(22) Filed: Jul. 11, 2018

(65) Prior Publication Data
US 2019/0050975 A1 Feb. 14, 2019

(30) Foreign Application Priority Data

Aug. 8, 2017 (JP) ................................. 2017-153155

(51) Int. Cl.
G06T 7/00 (2017.01)
G06K 15/14 (2006.01)
H04N 1/00 (2006.01)
G03G 15/00 (2006.01)

(52) U.S. Cl.
CPC ......... G06T 7/001 (2013.01); G03G 15/6517 (2013.01); G06K 15/14 (2013.01); H04N 1/00005 (2013.01); H04N 1/00018 (2013.01); G06T 2207/10008 (2013.01); G06T 2207/30144 (2013.01)

(58) Field of Classification Search
CPC ........... G06T 7/001; G06T 2207/30144; G06T 2207/10008; H04N 1/00018; H04N 1/00005; G06K 15/14; G03G 15/6517

USPC ........................................................ 358/1.14
See application file for complete search history.

(56) References Cited

U.S. PATENT DOCUMENTS

| 4,814,617 | A | * | 3/1989 | Goto | .................... H04N 1/0281 250/586 |
| 4,903,067 | A | * | 2/1990 | Murayama | ......... G03G 15/1655 347/116 |
| 2012/0321047 | A1 | * | 12/2012 | Iwase | ..................... G01T 1/243 378/98.2 |

FOREIGN PATENT DOCUMENTS

JP   H11-058698 A   3/1999
JP   2016-107429 A   6/2016

* cited by examiner

Primary Examiner — Tammy Paige Goddard
Assistant Examiner — Darryl V Dottin
(74) Attorney, Agent, or Firm — Buchanan Ingersoll & Rooney PC (57) ABSTRACT An image inspection apparatus includes: an image area signal generator that refers to information from an image forming apparatus to set lengths of turning on and off of a sub-scanning image area signal that determines turning on and off of reading, and generates the sub-scanning image area signal to indicate a start of image formation; a reader that reads an image; an inspector that compares a read image generated through reading with an expected-value image; and a controller that controls the image area signal generator, the reader, and the inspector, wherein, when a deviation equal to or greater than a predetermined threshold value is detected at positions of sub-scanning on corresponding images during the comparison, the controller adjusts an OFF period of the sub-scanning image area signal to eliminate a positional deviation of sub-scanning on the corresponding images between the read image and the expected-value image.

8 Claims, 10 Drawing Sheets

IMAGE INSPECTION APPARATUS AND IMAGE INSPECTION APPARATUS CONTROL PROGRAM

The entire disclosure of Japanese patent Application No. 2017-153155, filed on Aug. 8, 2017, is incorporated herein by reference in its entirety.

BACKGROUND

Technological Field

The present invention relates to an image inspection apparatus and an image inspection apparatus control program and, in particular, to a technology for appropriately inspecting image formation using roll paper.

Description of the Related Art

In an electrophotographic image forming system, an inspection apparatus having therein a reader is arranged on a downstream side of an image forming apparatus such that a printing abnormality in a printed matter is inspected from an image obtained by reading a sheet after the image formation.

Incidentally, in an image inspection apparatus for inspecting an image printed by an image forming apparatus in an in-line fashion, in the case of cut paper such as fixed form paper, the leading edge of the conveyed sheet is sensed by a photosensor such that the reading timing is specified as a timing after a predetermined time using this sensing signal as a trigger and a sub-scanning image area signal (V_Valid (hereinafter abbreviated as VV) signal) is generated. Here, the period during which the VV signal is turned on is a period for executing inspection of an image.

On the other hand, in the case of roll paper, printing is started from a state in which the roll paper is passed from a paper feeding apparatus to a paper discharging apparatus for the roll paper. For this reason, there is a problem in how to generate the sub-scanning image area signal which specifies the scanner timing of the image inspection apparatus without the concept of the leading edge of the sheet like the cut paper.

In addition, since the image forming apparatus and the image inspection apparatus are configured as different systems, the image forming timing and the reading timing are in an asynchronous relationship. Here, the clock frequency at which a circuit is moved is different between the respective apparatuses. Besides, even if the clock frequency at which the circuit is moved is notationally the same frequency in the respective apparatuses, the clock frequencies do not completely coincide because these apparatuses are asynchronous.

Therefore, if there is even a minute timing difference of less than one clock between the image forming timing and the reading timing when the reading timing is designated in the image inspection apparatus by some technique, it is supposed that, in the case of the roll paper which continues to form an image for several hundred meters, an error between the image forming timing and the reading timing accumulates to result in a large value. As a result, the reading position (timing) gradually deviates with respect to the printing position of the sub-scanning, which eventually results in a deviation to the extent that influences the inspection.

Note that, in the case of the above-mentioned cut paper, since the sub-scanning image area signal is generated by sensing the leading edge of the sheet, the accumulation of the error can be reset for each sheet of the cut paper and the accumulation of the error as in the roll paper has no influence.

In addition, as related technologies of this type, various related proposals have been made in JP 2016-107429 A and JP 1999-058698 A.

JP 2016-107429 A has made proposals regarding a non-uniform sheet conveyance speed and a reading cycle in image inspection on the roll paper. Here, only reading requiring positional accuracy is concerned because the reading cycle=the exposure time is satisfied and the reading cycle is generated based on sheet conveyance information from the image forming apparatus. However, no proposal has been made regarding "asynchronicity between the image forming apparatus and the image inspection apparatus" which is treated as an issue in the present application.

JP 1999-058698 A has proposed to control the turning on and off of an exposure lamp by using a rotary shaft of a printing roll (conveyance roller) as an encoder. However, a proposal regarding the reading start position corresponding to the printing start position in the case of the roll paper has not been mentioned.

That is, the generation of the sub-scanning image area signal for appropriately reading the print image in the image inspection apparatus that reads an image formed on the roll paper is neither mentioned nor suggested in any document of JP 2016-107429 A and JP 1999-058698.

SUMMARY

The present invention has been made in order to solve the above problems and it is an object of the present invention to provide an image inspection apparatus and an image inspection apparatus control program capable of reading a print image at an appropriate timing to inspect even in a case where an image forming apparatus and the image inspection apparatus are independent apparatuses and work in an asynchronous relationship when inspecting an image formed on roll paper.

To achieve the abovementioned object, according to an aspect of the present invention, there is provided an image inspection apparatus arranged on a downstream side of an image forming apparatus that forms an image on roll paper, and the image inspection apparatus reflecting one aspect of the present invention comprises: an image area signal generator that refers to information from the image forming apparatus to set lengths of turning on and off of a sub-scanning image area signal that determines turning on and off of reading, and generates the sub-scanning image area signal using a leading patch as a trigger, the leading patch being formed on the roll paper to indicate a start of image formation in the image forming apparatus; a reader that reads an image formed on the roll paper based on the sub-scanning image area signal; an inspector that compares a read image generated through reading by the reader with an expected-value image supplied from the image forming apparatus to inspect; and a controller that controls the image area signal generator, the reader, and the inspector, wherein in a case where a deviation equal to or greater than a predetermined threshold value is detected at positions of sub-scanning on corresponding images during comparison between the read image and the expected-value image by the inspector, the controller adjusts an OFF period of the sub-scanning image area signal generated by the image area signal generator to eliminate a positional deviation of sub-scanning on the corresponding images between the read image and the expected-value image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, embodiments of a technology for appropriately inspecting image formation using roll paper in an image forming system 1 including an image inspection apparatus will be described in detail with reference to the drawings. The action of the image inspection apparatus included in the image forming system 1 is controlled based on an image inspection apparatus control program.

[Configuration of Image Forming System]

Figure 1:
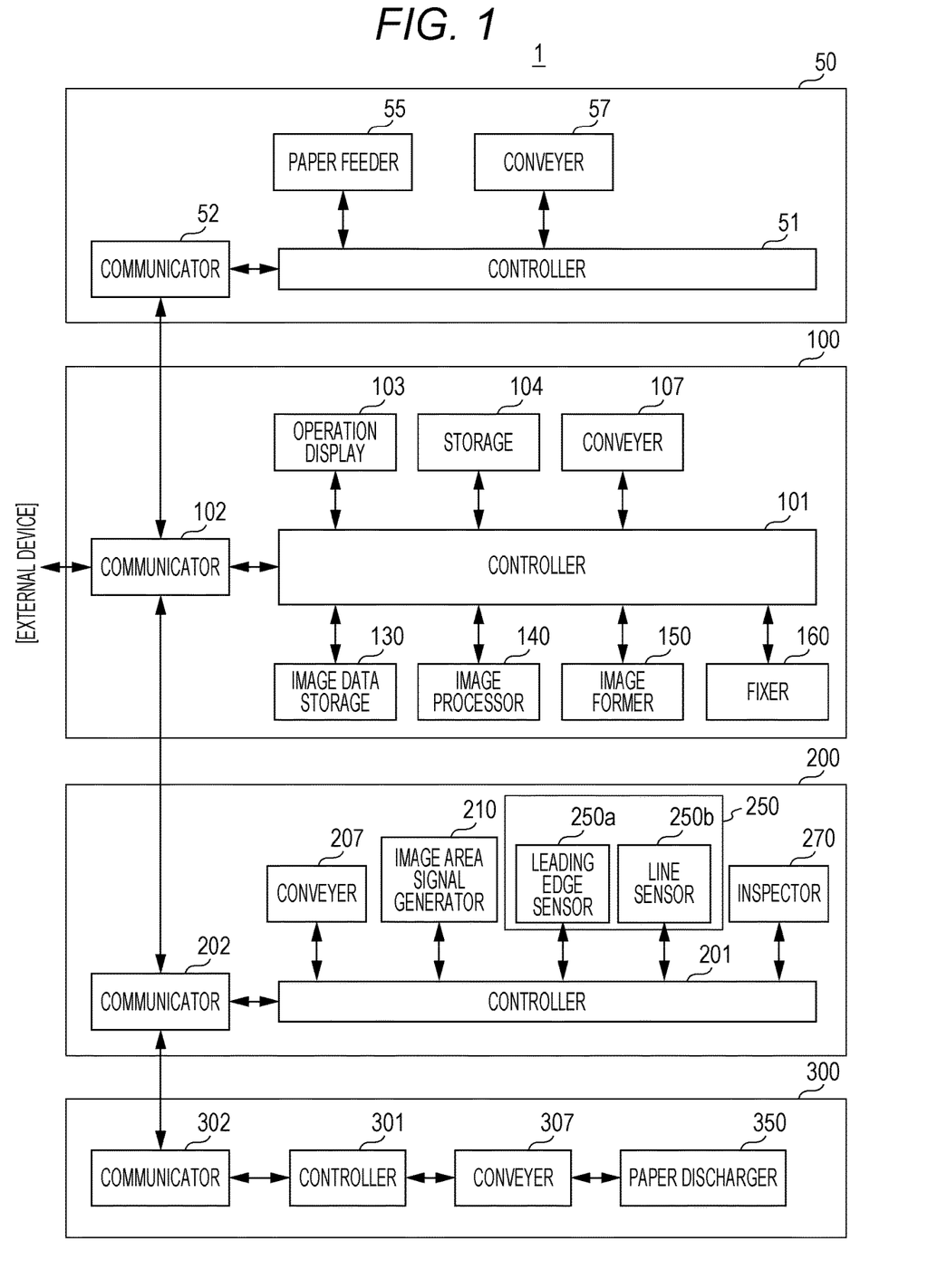
FIG. 1 is a configuration diagram illustrating an image inspection apparatus according to an embodiment of the present invention and a surrounding configuration of the image inspection apparatus.
Figure 2:
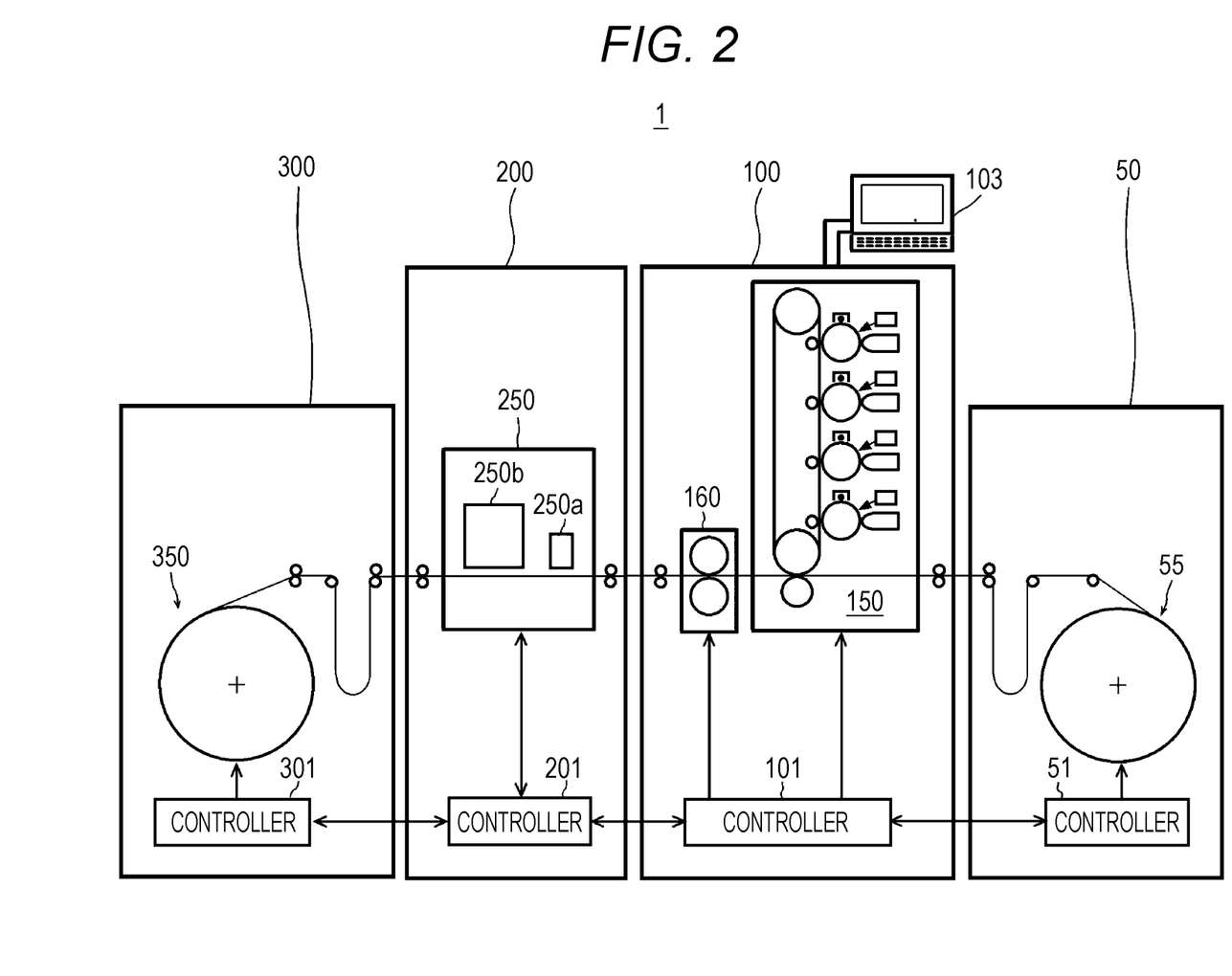
FIG. 2 is a configuration diagram illustrating the image inspection apparatus according to the embodiment of the present invention and a surrounding configuration of the image inspection apparatus.

Here, as the configuration of the image forming system 1, a configuration example of the image forming system 1 in which a paper feeding apparatus 50, an image forming apparatus 100, an image inspection apparatus 200, and a paper discharging apparatus 300 are connected along a sheet conveying direction will be described in detail based on FIGS. 1 and 2. Note that other apparatuses not illustrated here, such as an intermediate apparatus and a post-processing apparatus, may be connected in the image forming system 1.

The paper feeding apparatus 50 is constituted by a controller 51, a communicator 52, a paper feeder 55, and a conveyer 57 provided therein. The controller 51 controls each member in the paper feeding apparatus 50 based on an instruction from a controller 101 described later. The communicator 52 communicates with another apparatus that is set, such as the image forming apparatus 100. The paper feeder 55 feeds roll paper from a sheet roll toward the image forming apparatus 100. The conveyer 57 conveys the roll paper within the paper feeding apparatus 50.

The image forming apparatus 100 is constituted by the controller 101, a communicator 102, an operation display 103, a storage 104, a conveyer 107, an image data storage 130, an image processor 140, an image former 150, and a fixer 160 provided therein. The controller 101 controls each member in the image forming apparatus 100. The communicator 102 communicates with another apparatus that is set (an external device, the paper feeding apparatus 50, the paper discharging apparatus 300, and the like). The operation display 103 accepts an operation input by a user and displays the state of the image forming apparatus 100. The storage 104 stores various settings. The conveyer 107 conveys the roll paper toward the image former 150 within the image forming apparatus. The image data storage 130 stores image data and various items of data at the time of image formation. The image processor 140 executes various image processes necessary for image formation. The image former 150 forms an image on the roll paper based on an image formation command and image data held in a printing image memory in the image data storage 130. The fixer 160 stabilizes an image formed on the roll paper with toner by heat and pressure.

The image inspection apparatus 200 is constituted by a controller 201, a communicator 202, a conveyer 207, an image area signal generator 210, a reader 250, and an inspector 270 provided therein. The image area signal generator 210 refers to information from the image forming apparatus 100 to set the lengths of turning on and off of a sub-scanning image area signal that determines whether to turn on or off the reading, and generates a sub-scanning image area signal VV. The reader 250 is constituted by a leading edge sensor 250a that reads a trigger patch and a line sensor 250b that reads an image, which are included therein. The inspector 270 compares a read image generated through reading by the reader 250 and an expected-value image supplied from the image forming apparatus 100 to inspect. In addition, when a deviation equal to or greater than a predetermined threshold value is detected on corresponding images at a position of the sub-scanning during the comparison between the read image and the expected-value image by the inspector 270, the controller 201 adjusts an OFF period of the sub-scanning image area signal generated by the image area signal generator 210, thereby eliminating a positional deviation of the sub-scanning on the corresponding images between the read image and the expected-value image.

The paper discharging apparatus 300 is constituted by a controller 301, a communicator 302, a conveyer 307, and a paper discharger 350 provided therein. The controller 301 controls each member in the paper discharging apparatus 300 based on an instruction from the controller 101. The communicator 302 communicates with another apparatus that is connected, such as the image forming apparatus 100. The conveyer 307 conveys a sheet within the paper discharging apparatus 300. The paper discharger 350 winds the roll paper which has been roll-fed and on which an image has been formed, in a roll shape while discharging the roll paper as a sheet roll.

Note that, in the above configuration, while the image forming apparatus 100, the image inspection apparatus 200, and the paper discharging apparatus 300 are arranged as the image forming system 1 along a roll paper conveying direction, each apparatus serves as an independent apparatus and also a clock of each apparatus is independent. That is, it is assumed that a process such as clock synchronization is not performed between the apparatuses.

In addition, in the above configuration, the controllers 101, 201, and 301 can communicate with each other via the communicators 102, 202, and 302, respectively to transfer, for example, how many copies are to be printed on the roll paper, the remaining amount of the roll paper, and the expected-value image used as a comparison target at the time of inspection by the image inspection apparatus 200 from the image forming apparatus 100 to the image inspection apparatus 200 and also to transfer an inspection result from the image inspection apparatus 200 to the image forming apparatus 100, where the communication protocol is not particularly limited.

Image formation in the image forming apparatus 100 is executed by the image former 150 controlled by the controller 101 and, using a frequency such as a pixel clock generated by an oscillator (not illustrated) as a reference, image formation is performed on the roll paper at an arbitrary image forming cycle. Note that this image formation is of a generally known type.

Reading by the image inspection apparatus 200 is controlled by the controller 201 and, using a frequency different from that of the image forming apparatus 100 as a reference, such as a reading clock generated by an oscillator (not illustrated), the reader 250 reads an image at an arbitrary reading cycle. In addition, as this reading, reading of a leading patch on the roll paper by the leading edge sensor 250a and reading of an image on the roll paper by the line sensor 250b are executed. Here, the longitudinal direction of the line sensor 250b is a vertical direction (main scanning direction) in the plane of the page of FIG. 2 and the line sensor 250b reads an image on the roll paper conveyed in a conveying (sub-scanning) direction from right to left in the plane of the page of FIG. 2. Note that this reading is of a generally known type.

For the inspection of the image in the image inspection apparatus 200, the expected-value image is transferred from the image forming apparatus 100 to the image inspection apparatus 200 in advance before image formation. This expected-value image is equivalent to image forming image data held in a print preparation memory or the like to be used for image formation.

Then, the image inspection apparatus 200 applies a predetermined image process to at least one of the expected-value image and the read image to make comparison and collation with the expected-value image, thereby inspecting the image formation defect. The target of this inspection is stain adhesion, image loss, image mistake, and the like. This image inspection is of a generally known type. In addition, taking into consideration the reading performance of the line sensor 250b, the image process is first applied to at least one of the read image and the expected-value image to make the characteristics of the read image and the expected-value image the same as each other or approximate to each other and then a comparison is made. By configuring in this manner, an appropriate inspection is enabled without treating a slight deviation of the image position as a difficulty.

[Description of Principle of Image Inspection]

Figure 3:
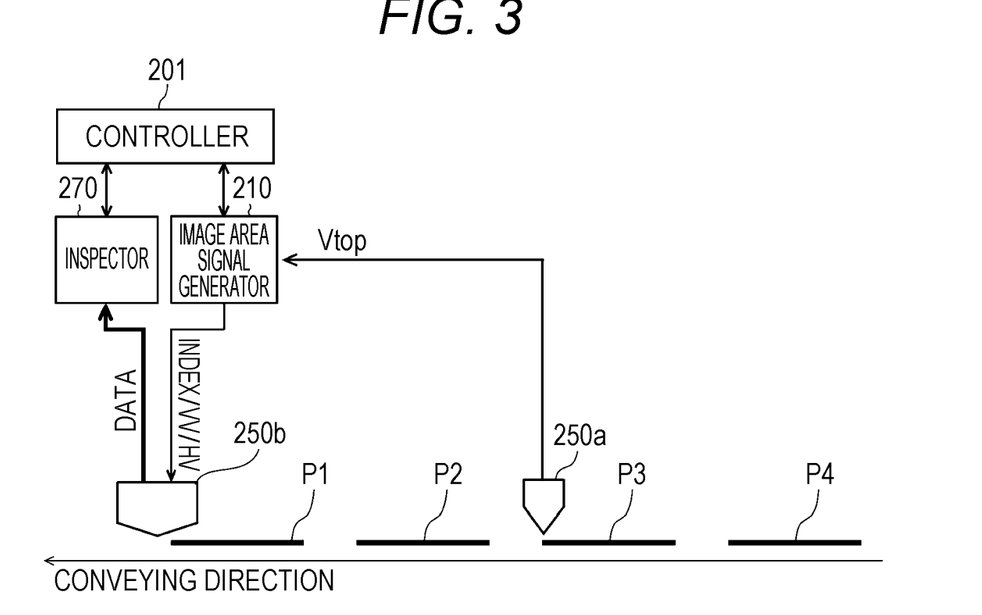
FIG. 3 is an explanatory diagram schematically illustrating how basic image inspection proceeds.
Figure 4:
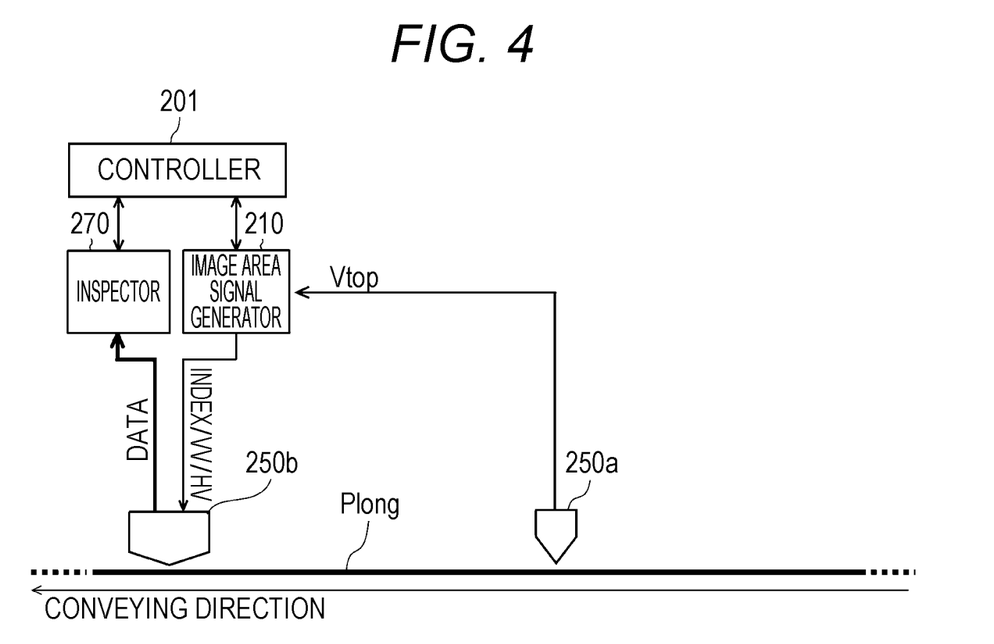
FIG. 4 is an explanatory diagram schematically illustrating how basic image inspection proceeds.
Figure 5A:
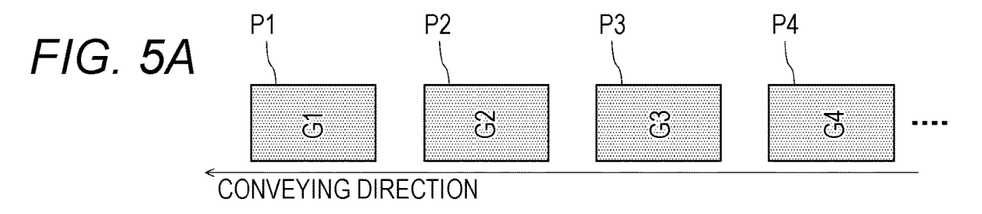
FIGS. 5A and 5B are explanatory diagrams schematically illustrating how basic image inspection proceeds.
Figure 5B:
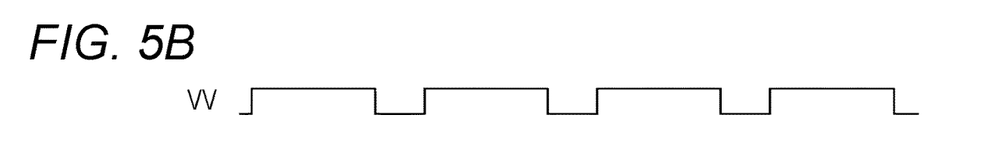
Figure 6A:
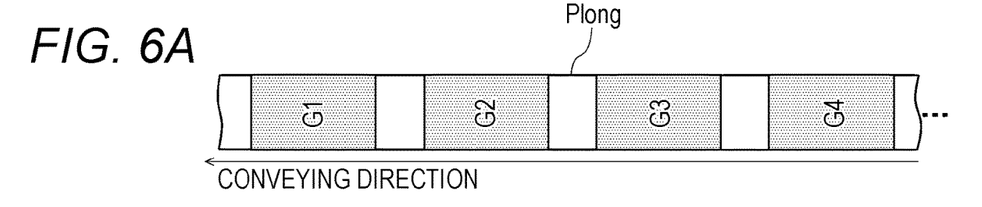
FIGS. 6A and 6B are explanatory diagrams schematically illustrating how basic image inspection proceeds.
Figure 6B:
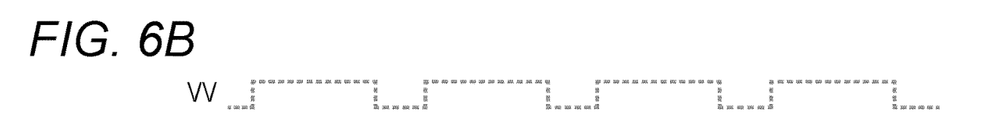

Prior to explaining the action of the present embodiment, the basic action of image inspection will be described here with reference to various explanatory diagrams in FIGS. 3 to 6B. Here, FIG. 3 illustrates how an image is inspected by the image inspection apparatus 200 using pieces of cut paper P1, P2, . . . , whereas FIG. 4 illustrates how an image is inspected by the image inspection apparatus 200 using roll paper Plong. In addition, FIGS. 5A and 5B illustrate how the sub-scanning image area signal (V_Valid signal (hereinafter abbreviated as a VV signal in the drawings)) functions when the cut paper is used, whereas FIGS. 6A and 6B illustrate how the sub-scanning image area signal functions when the roll paper is used.

First, FIG. 3 illustrates a case as to how an image is formed by the image forming apparatus 100 using the pieces of cut paper P1, P2, P3, P4, . . . as sheets instead of the roll paper and inspected by the image inspection apparatus 200.

The reader 250 of the image inspection apparatus 200 is equipped with the leading edge sensor 250a that senses the leading edge of the sheet being passed and notifies the image area signal generator 210 of a leading edge sensing signal (Vtop signal) sensed by this leading edge sensor 250a. The image area signal generator 210 determines an ON time and an OFF time for the reading by the line sensor 250b using the leading edge sensing signal as a reference. The ON time and the OFF time for the reading are defined by the sub-scanning image area signal as illustrated in FIGS. 5A and 5B and, in the case of the cut paper, defined by the sub-scanning length (FIG. 5A) in agreement with the sheet size (FIG. 5B). Here, the period during which the sub-scanning image area signal is turned on is a period for executing inspection of an image.

On the other hand, FIG. 4 illustrates a case as to how an image is formed by the image forming apparatus 100 using the roll paper Plong as a sheet and inspected by the image inspection apparatus 200. Here, in the case of the roll paper Plong, it is necessary to draw out the roll paper and set the roll paper on a paper discharge roll of the paper discharger 350 before printing. For this reason, there is no concept of the leading edge of a sheet as in the cut paper (refer to FIGS. 4 and 6A). In other words, since there is no leading edge of the sheet, it is impossible to generate a proper sub-scanning image area signal (refer to FIG. 6B), such that the image inspection apparatus 200 cannot judge when to read the printed image.

In addition, since the image forming apparatus 100 and the image inspection apparatus 200 are in an asynchronous relationship, when the respective apparatuses continue image formation and reading by independent control, a minute error between the image forming cycle and reading cycle exerts influence. As a specific example, when the apparatuses have the same resolution as each other, the reading cycle is set using the image forming cycle as a reference such that the image forming cycle=the reading cycle is satisfied. However, since driving frequencies (A1 and A2) of clocks are different between the both, the two cycles do not completely coincide at the phase level and consequently have an error of ½ clock pulse at the maximum.

In the case of the cut paper, since it is possible to re-synchronize with the Vtop signal generated for each sheet and the error is originally very small, the error hardly has influence within the range of printing one copy. On the other hand, in the case of the roll paper, since there is no timing of re-synchronization for each image like the cut paper, the error consistently accumulates as the number of copies progresses. As a result, while the image formation and the reading are repeatedly executed on the roll paper having a length of several hundreds of meters, the reading timing with respect to the image formation gradually deviates, which ultimately affects the inspection.

[Action of Embodiment]

Figure 7:
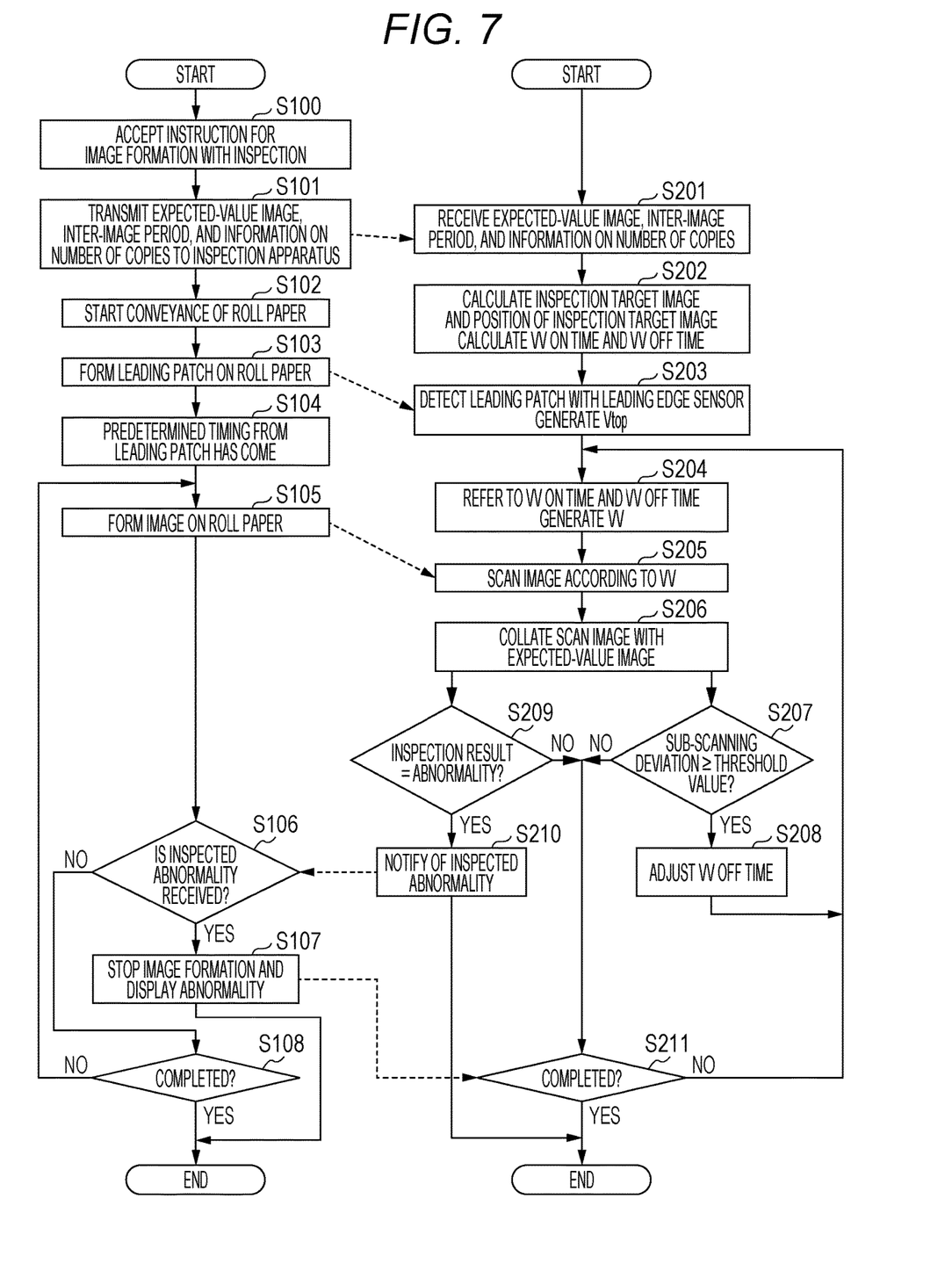
FIG. 7 is a flowchart illustrating an action of image inspection according to the embodiment of the present invention.

With reference to a flowchart in FIG. 7 and various explanatory diagrams in FIGS. 8A to 8D and the subsequent drawings, the following describes the action according to the embodiment in which an appropriate sub-scanning image area signal is generated and inspection of an adjustment image is appropriately executed when image formation and inspection are carried out using the roll paper.

First, instructions for image formation and image inspection are input to the operation display 103 of the image forming apparatus 100 from the user (step S100 in FIG. 7). At this time, an instruction as to how many copies of the image of what size to form is also input. These instructions and information are notified from the operation display 103 to the controller 101. Here, the controller 101 generates an image forming image and an expected-value image from the image data for which image formation is instructed. In addition, various types of information such as the number of image forming copies, the image forming size, and the image forming interval are generated based on the instruction for image formation.

Furthermore, in preparation for image formation, the roll paper is set to the paper discharger 350 in the paper discharging apparatus 300 by the user from the paper feeder 55 in the paper feeding apparatus 50 by way of the image forming apparatus 100 and the image inspection apparatus 200.

Then, under the control of the controller 101, various types of information such as the order to execute image inspection, the expected-value image, the number of image forming copies, the image forming size, and the image forming interval are transferred from the image forming apparatus 100 to the image inspection apparatus 200 (steps S101 and S201 in FIG. 7).

Note that, in the image inspection apparatus 200, the controller 201 prepares for inspection based on the above-mentioned various types of information. In addition to this preparation, in order to self-generate the sub-scanning image area signal, the controller 201 determines the lengths of the ON time (VV ON time) and the OFF time (VV OFF time) of the sub-scanning image area signal from the image size and the print interval of the expected-value image and determines how many times the sub-scanning image area signal is to be generated from the information on the number of copies to be printed (step S202 in FIG. 7).

Meanwhile, in the image forming apparatus 100, the controller 101 extracts an image suitable for detecting the sub-scanning position from the expected-value image and calculates the number of pixels from the leading edge of the image to store as the expected value of the sub-scanning position beforehand. The image data suitable for detection represents an image such as a solid image which can be reproduced even after being read, a leading patch for position detection printed on the leading edge of the image data, and the like. As will be described later, the image inspection apparatus 200 calculates the measurement value of the sub-scanning position from the image data read for inspection using the same method to compare, thereby judging whether reading at an appropriate timing is achieved.

Here, in the image forming apparatus 100, the controller 101 starts conveyance of the roll paper to print a leading patch as a sign to start image formation after a predetermined timing and controls the conveyer 107 and the image former 150 such that image formation is started after the predetermined timing from the leading patch has come (steps S102, S103, S104, and S105 in FIG. 7).

Figure 8A:
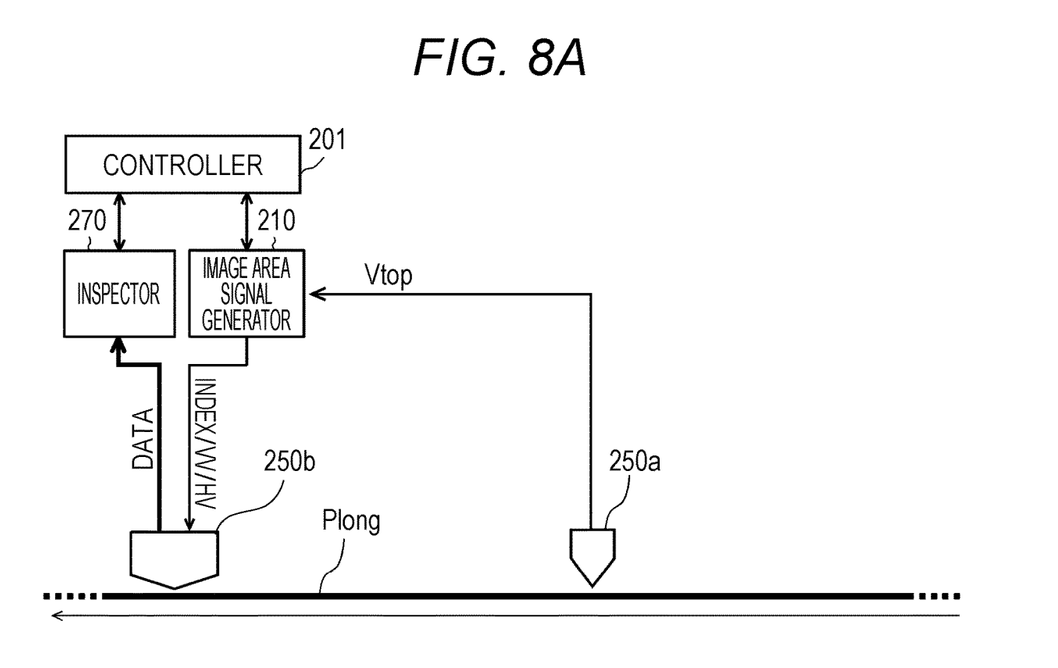
FIGS. 8A to 8D are explanatory diagrams schematically illustrating how the image inspection according to the embodiment of the present invention proceeds.
Figure 8B:
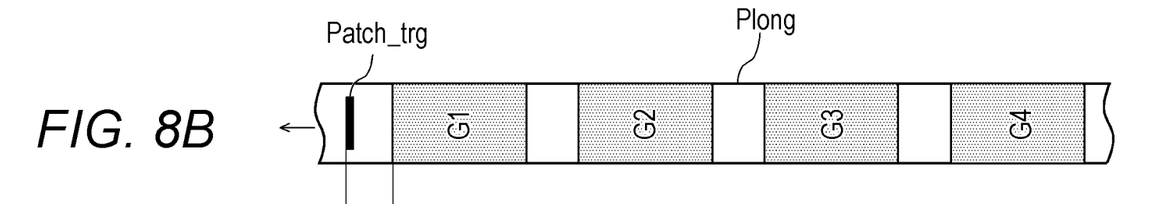
Figures 8C, 8D:
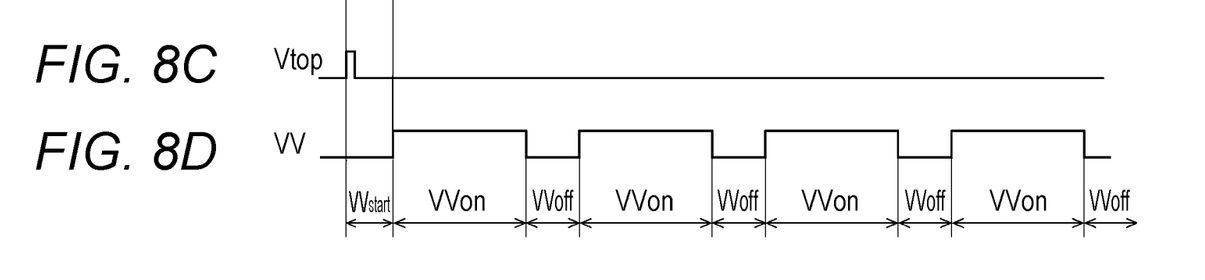

In the image inspection apparatus 200, once the roll paper is conveyed by the conveyer 207 (FIG. 8A) and the leading patch (Patch_trg in FIG. 8B) is read by the leading edge sensor 250a to generate the Vtop signal (FIG. 8C) (step S203 in FIG. 7), the image area signal generator 210 starts generation of the sub-scanning image area signal after the predetermined timing from this Vtop signal (step S204 in FIG. 7, FIG. 8D). Here, the image area signal generator 210 generates the sub-scanning image area signal in accordance with the VV ON time and the VV OFF time determined by the controller 201. Note that the leading patch has a shape that can be easily sensed by the leading edge sensor 250a and is, for example, a rectangular solid patch (refer to Patch_trg in FIG. 8B).

Here, in the image forming apparatus 100, the image former 150 forms an image on the roll paper under the control of the controller 101 (step S105 in FIG. 7) and, concurrently with this formation, in the image inspection apparatus 200, the reader 250 executes reading for inspection under the control of the controller 201 (step S205 in FIG. 7). Note that the reader 250 executes reading according to the sub-scanning image area signal (VV ON) generated by the image area signal generator 210.

Here, the inspector 270 collates the expected-value image with the read image (step S206 in FIG. 7) and checks whether there is a difference recognized as abnormality (step S209 in FIG. 7). If no abnormality is found (NO in step S209 in FIG. 7), generation of the sub-scanning image area signal (step S204 in FIG. 7), reading according to the sub-scanning image area signal (step S205 in FIG. 7), and comparison and collation between the expected-value image and the read image (step S206 in FIG. 7) are repeated until reaching the final page of image formation that has been started (step S211 in FIG. 7). Similarly, the controller 101 that is not notified of an abnormality by the controller 201 (NO in step S106 in FIG. 7) controls such that image formation on the roll paper is repeatedly executed by the image former 150 until reaching the final page of image formation (step S105 in FIG. 7).

On the other hand, when an abnormality is found by the inspector 270 (YES in step S209 in FIG. 7), the controller 201 notifies the controller 101 of the abnormality via the communicator 202 and the communicator 102 (steps S210 and S106 in FIG. 7). Upon being notified of the abnormality by the controller 201 via the communicator 202 and the communicator 102, the controller 101 controls each member so as to stop image formation by the image former 150 and displays the occurrence of abnormality on the operation display 103 (step S107 in FIG. 7). Note that, in this case, in addition to image formation and sheet conveyance in the image forming apparatus 100, paper feed from the paper feeding apparatus 50, sheet conveyance in the image inspection apparatus 200, and paper discharge in the paper discharging apparatus 300 are interlocked to be stopped.

Then, since the image forming apparatus 100 and the image inspection apparatus 200 are in a clock asynchronous relationship in this image formation (step S105 in FIG. 7)

and reading (step S205 in FIG. 7), an minute error between the image forming cycle and the reading cycle gradually accumulates.

Thus, in order to check the accumulation of minute errors between the image forming cycle and the reading cycle in such a clock asynchronous relationship, in the image inspection apparatus 200, the controller 201 and the inspector 270 compare and collate the expected-value image (FIG. 9B described later) with the read image (FIG. 9D described later) (step S206 in FIG. 7) to check whether the sub-scanning deviation is equal to or greater than a preset threshold value (step S207 in FIG. 7).

Here, when the sub-scanning deviation is equal to or greater than the preset threshold value (YES in step S207 in FIG. 7), the image area signal generator 210 adjusts the VV OFF time in line with the instruction from the controller 201 so as to eliminate the above accumulation of errors (step S208 in FIG. 7). On the other hand, if the sub-scanning deviation is not equal to or greater than the threshold value (NO in step S207 in FIG. 7), generation of the sub-scanning image area signal (step S204 in FIG. 7), reading according to the sub-scanning image area signal (step S205 in FIG. 7), and comparison and collation between the expected-value image and the read image (step S206 in FIG. 7) are repeated until reaching the final page of image formation that has been started (step S211 in FIG. 7).

Hereinafter, the sub-scanning deviation will be described in detail with reference to a specific example of a time chart in FIGS. 9A to 9D and the subsequent drawings.

Figure 9A:
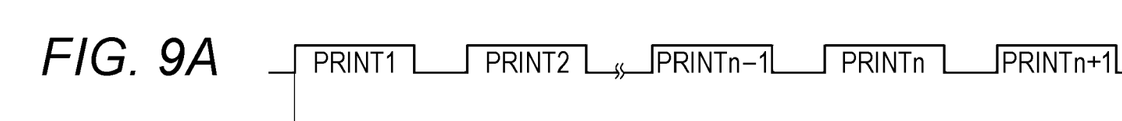
FIGS. 9A to 9D are explanatory diagrams schematically illustrating how the image inspection according to the embodiment of the present invention proceeds.
Figure 9B:
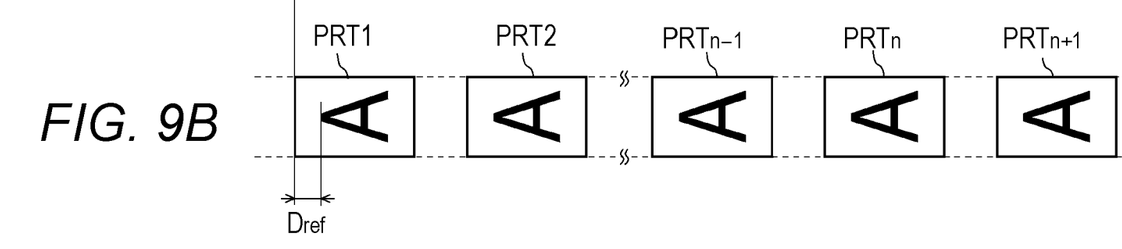

FIG. 9A depicts sub-scanning image area signals (PRINT1 to PRINTn+1) generated for image formation in the image forming apparatus 100, whereas FIG. 9B depicts expected-value images (PRT1 to PRTn+1) generated from image forming image data for which image formation on the roll paper is to be executed in the image forming apparatus 100. Note that, if there is no stain or loss or the like, these expected-value images are the same as the images formed on the roll paper. In addition, FIG. 9C depicts sub-scanning image area signals (SCAN1 to SCANn+1) generated by the image area signal generator 210 in the image inspection apparatus 200, whereas FIG. 9D depicts read images (SC1 to SCn+1) obtained by the reader 250 based on the sub-scanning image area signals in the image inspection apparatus 200.

Here, a case where the same image is repeatedly formed is assumed as illustrated in FIG. 9B and a distance from the leading edge of the expected-value image thereof to a predetermined measurement target point is assigned as a reference value Dref. The predetermined measurement target point means a partial area of the image which can be easily and precisely extracted from the image such that error accumulation involving the sub-scanning deviation can be easily checked. For example, in FIGS. 9A to 9D, a head portion of the letter "A" where two diagonal lines thereof are joined is taken as the predetermined measurement target point. This measurement target point may be designated by the user or may be designated by the controller 101 in the image forming apparatus 100. Additionally, this reference value Dref is calculated by the controller 201 or the inspector 270 beforehand based on the expected-value image sent from the image forming apparatus 100. Note that, if image formation for a plurality of images is desired, it is only necessary to individually calculate the reference values Dref of the plurality of images.

Figures 9C, 9D:
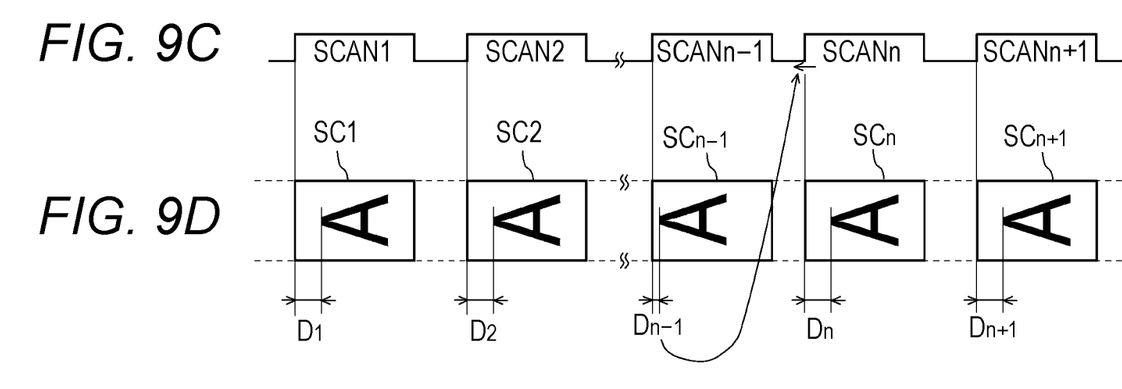

FIG. 9C depicts the sub-scanning image area signals SCAN1 to SCANn+1 generated by the image area signal generator 210. The reader 250 reads images on the roll paper in accordance with these sub-scanning image area signals SCAN1 to SCANn+1 (refer to FIG. 9C), thereby generating the read images SC1 to SCn+1 (refer to FIG. 9D). Then, as in the case of the expected-value image described above, the controller 201 or the inspector 270 sequentially works out distances D1 to Dn+1, each of which is a distance from the leading edge of the image to the predetermined measurement target point, for these read images SC1 to SCn+1, respectively. Then, the controller 201 and the inspector 270 sequentially compare and collate the reference value Dref (refer to FIG. 9B) obtained from the above expected-value image with D1 to Dn+1 (refer to FIG. 9D) obtained from the read images SC1 to SCn+1 (step S206 in FIG. 7) to check whether the sub-scanning deviation is equal to or greater than the preset threshold value (step S207 in FIG. 7).

Here, for example, the threshold value for the sub-scanning deviation is designated as 0.5 Dref with reference to the above reference value Dref. That is, a case where the distances D1 to Dn+1 from the leading edges of the images to the measurement target points are smaller than 0.5 Dref (refer to FIGS. 11A and 11B described later) and a case where the distances D1 to Dn+1 are larger than 1.5 Dref (refer to FIGS. 12A and 12B described later) are judged as a case where the sub-scanning deviation is equal to or greater than the preset threshold value. Note that this determination of the threshold value is merely an example and another value or another range may be employed.

In addition, for the inspection as to whether there is an abnormality in the image by the inspector 270 (step S209 in FIG. 7), since corresponding feature points between the read image and the expected-value image are extracted and the feature points of these images are compared and inspected with each other, a slight deviation of the image position is not treated as a difficulty. For this reason, it is possible to allow a certain width for the above-described threshold value.

Furthermore, for the inspection as to whether there is an abnormality in the image by the inspector 270 (step S209 in FIG. 7), it is also possible to attach predetermined marks such as register marks in advance to the four corners of the image, or the like such that the corresponding marks are first matched between the read image and the expected-value image and then the images are compared to inspect the presence of a difference. Also in this case, an appropriate inspection while adjusting the period of the sub-scanning image area signal is enabled without treating a slight deviation of the image position as a difficulty.

Figure 10A:
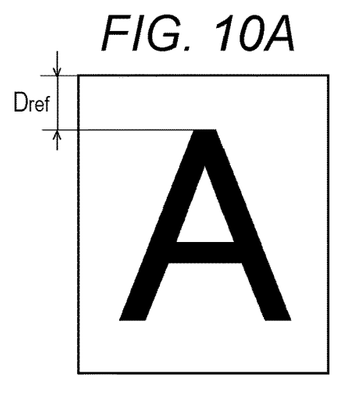
FIGS. 10A and 10B are explanatory diagrams schematically illustrating how the image inspection according to the embodiment of the present invention proceeds.
Figure 10B:
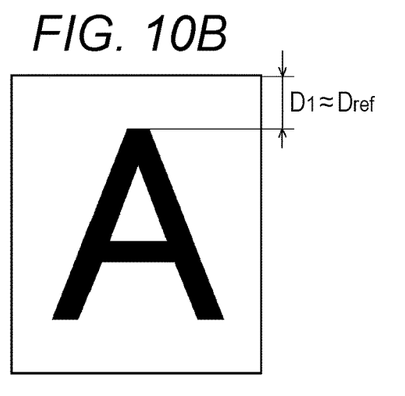

In FIG. 9D, D1 obtained in the read image SC1 is close to the reference value Dref and, as illustrated in FIGS. 10A and 10B, the sub-scanning deviation has not reached the threshold value (NO in step S207, S211 in FIG. 7). Likewise, D2 obtained in the read image SC2 is also close to the reference value Dref and the sub-scanning deviation has not reached the threshold value (NO in step S207, S211 in FIG. 7). In this case, the image area signal generator 210 continues to generate the sub-scanning image area signal in accordance with the initial cycle (step S204 in FIG. 7).

Figure 11A:
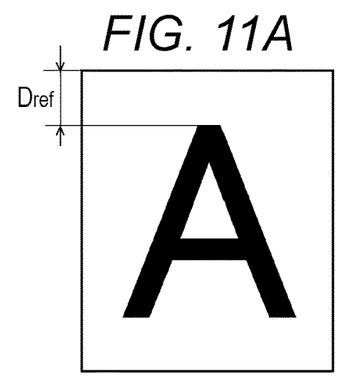
FIGS. 11A and 11B are explanatory diagrams schematically illustrating how the image inspection according to the embodiment of the present invention proceeds.
Figure 11B:
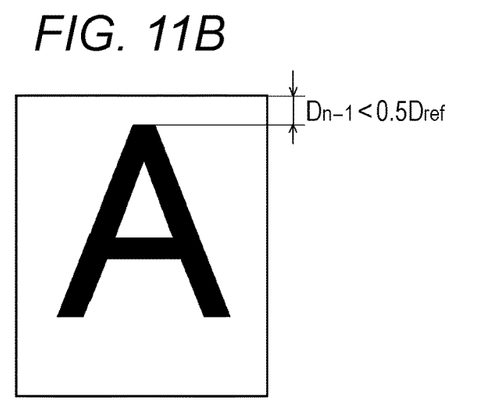
Figure 12A:
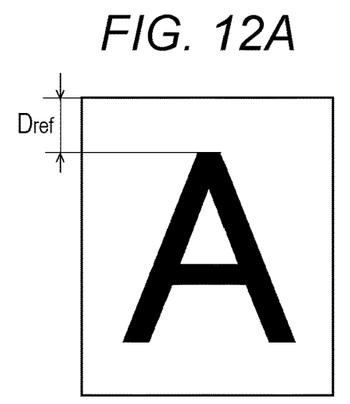
FIGS. 12A and 12B are explanatory diagrams schematically illustrating how the image inspection according to the embodiment of the present invention proceeds.
Figure 12B:
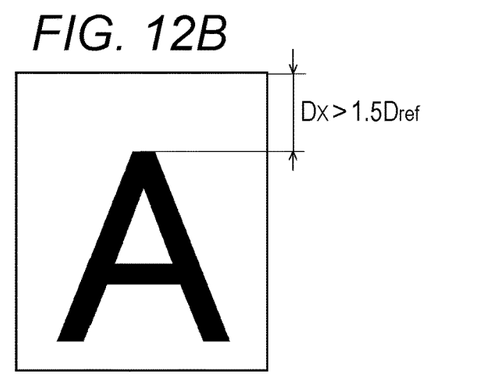

On the other hand, in FIG. 9D, Dn−1 obtained in a read image SCn−1 is less than 0.5 Dref which is half of the reference value Dref and, as illustrated in FIGS. 11A and 11B, the sub-scanning deviation has exceeded the threshold value (YES in step S207 in FIG. 7).

Here, in this case, in order to eliminate the accumulation of errors involving the sub-scanning deviation by expanding the distance from the leading edge of the image to the measurement target point, the image area signal generator 210 adjusts the VV OFF time to be shorter such that the timing of the sub-scanning image area signal SCANn is advanced (Dn−1 in FIG. 9D, SCANn−1 and SCANn in FIG. 9C, step S208 in FIG. 7). With this adjustment, in the read image SCn according to the sub-scanning image area signal SCANn, the distance Dn from the leading edge of the image to the measurement target point is close to the reference value Dref and the sub-scanning deviation is eliminated.

In addition, although not illustrated in the time chart in FIGS. 9A to 9D, when Dx obtained in a read image SCx becomes equal to or greater than 1.5 Dref, which is 1.5 times the reference value Dref (FIGS. 12A and 12B), and the sub-scanning deviation has exceeded the threshold value, in order to eliminate the accumulation of errors involving the sub-scanning deviation by narrowing the distance from the leading edge of the image to the measurement target point, the image area signal generator 210 only needs to adjust the VV OFF time to be longer in this case such that the timing of the sub-scanning image area signal SCANn is delayed. With this adjustment, in a read image SCx+1 according to a sub-scanning image area signal SCANx+1, the distance Dn from the leading edge of the image to the measurement target point is close to the reference value Dref and the sub-scanning deviation is eliminated.

[Another Embodiment (1)]

The above description has used a specific example of eliminating the sub-scanning deviation in such a manner that the sub-scanning deviation obtained in the read image SCn−1 corresponding to the sub-scanning image area signal SCn−1 is adjusted with the OFF period immediately before the sub-scanning image area signal SCn corresponding to the next read image SCn (refer to FIGS. 9C and 9D).

Here, the occurrence of the sub-scanning deviation due to the error accumulation is caused by the accumulation of minute differences in asynchronous clocks and has an exceedingly gentle tendency. Accordingly, the sub-scanning deviation may be eliminated in such a manner that the sub-scanning deviation obtained in the read image SCn−1 corresponding to the sub-scanning image area signal SCn−1 is adjusted with the OFF period immediately before a sub-scanning image area signal SCn−1+z corresponding to a read image SCn−1+z after several scans, that is, assuming $2 \leq z \leq 10$.

[Another Embodiment (2)]

Figure 13:
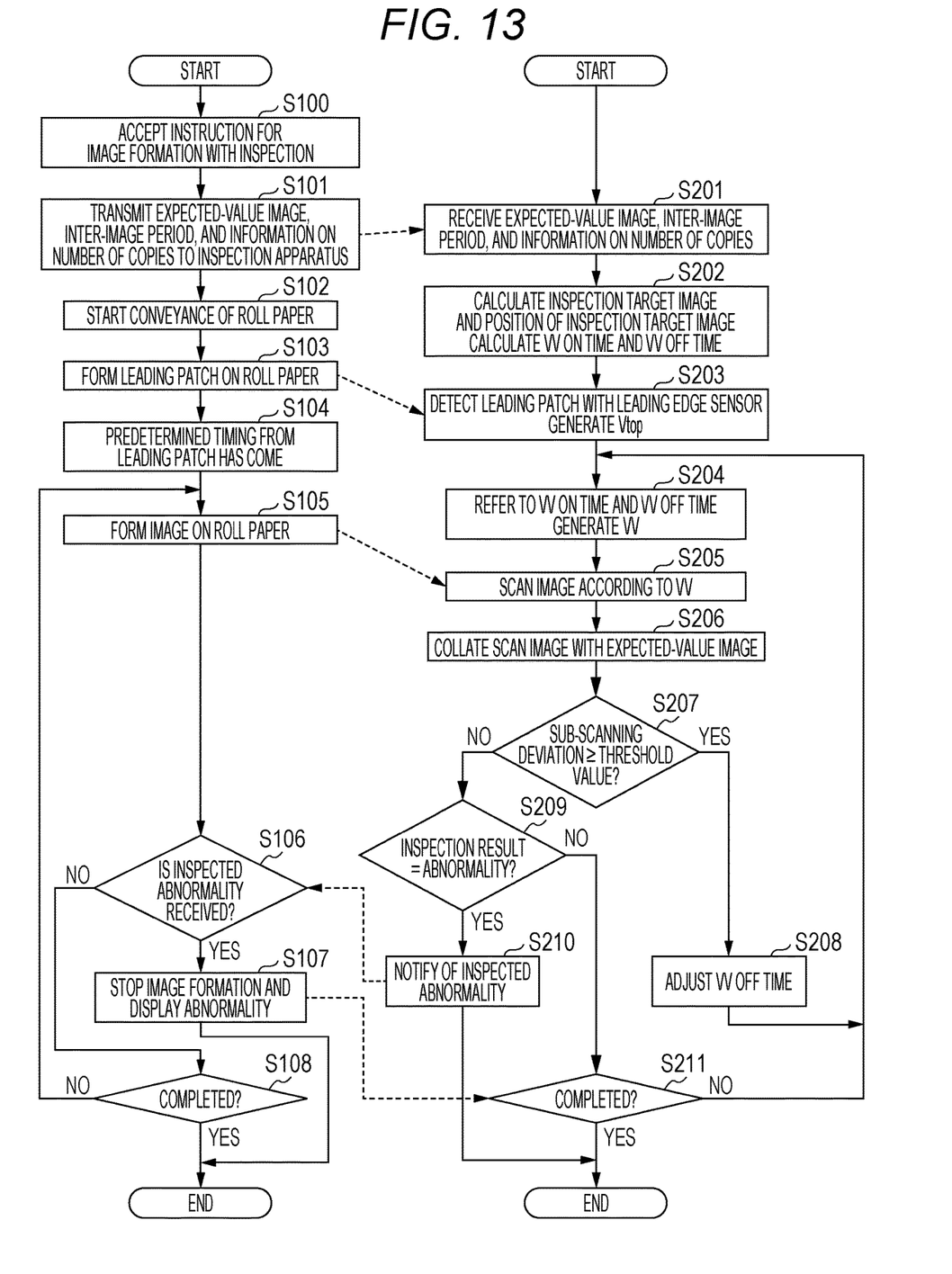
FIG. 13 is a flowchart illustrating another action of the image inspection according to the embodiment of the present invention.

In the above description, the aforementioned error accumulation check (step S207 in FIG. 7) and abnormality check (step S209 in FIG. 7) are concurrently executed as illustrated in FIG. 7. In contrast to this, as illustrated in FIG. 13, the processing procedure may be changed so as to first execute the error accumulation check (step S207 in FIG. 13) and then execute the abnormality check (step S209 in FIG. 13). Note that, in FIG. 13, since the processing order is the same as in FIG. 7 except for the order of steps S207 and S209, duplicate description will be omitted.

[Effects Obtained by Embodiments]

(1) In the image inspection apparatus 200 and the image inspection apparatus control program that controls the image inspection apparatus 200 according to the above embodiments, the information from the image forming apparatus 100 is referred to to set the lengths of turning on and off, the sub-scanning image area signal is generated using the leading patch formed on the roll paper as a trigger, an image formed on the roll paper is read based on the sub-scanning image area signal, in a case where a deviation equal to or greater than the predetermined threshold value is detected at the corresponding positions of the sub-scanning between the read image and the expected-value image when the read image is compared with the expected-value image to be inspected, the OFF period of the sub-scanning image area signal is adjusted, and the positional deviation of the sub-scanning in the corresponding images between the read image and the expected-value image is eliminated. Therefore, even in a case where the image forming apparatus and the image inspection apparatus are independent apparatuses and work in an asynchronous relationship when inspecting the image formed on the roll paper, it becomes possible to read the print image at an appropriate timing to properly inspect.

In addition, by applying the image process to at least one of the read image and the expected-value image to make comparison and inspection in a state of characteristics approximate to each other, an appropriate inspection while adjusting the period of the sub-scanning image area signal is enabled without treating a slight deviation of the image position as a difficulty.

Furthermore, when marks for position detection which are incorporated in advance at respective corresponding positions on the read image and the expected-value image are used to compare the read image with the expected-value image to inspect while the marks on these images are matched with each other, an appropriate inspection while adjusting the period of the sub-scanning image area signal is enabled without treating a slight deviation of the image position as a difficulty.

Additionally, by extracting corresponding feature points between the read image and the expected-value image to compare the feature points of these images with each other to inspect, an appropriate inspection while adjusting the period of the sub-scanning image area signal is enabled without treating a slight deviation of the image position as a difficulty.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image inspection apparatus arranged on a downstream side of an image forming apparatus that forms an image on roll paper, the image inspection apparatus comprising:
    a hardware processor that is configured to refer to information from the image forming apparatus to set lengths of turning on and off of a plurality of sub-scanning image area signals that determine turning on and off of reading, and generates the sub-scanning image area signals using a leading patch as a trigger for the plurality of sub-scanning image area signals, the leading patch being formed on the roll paper to indicate a start of image formation in the image forming apparatus;
    a reader that reads an image formed on the roll paper based on the sub-scanning image area signal;
    an inspector that compares a read image generated through reading by the reader with an expected-value image supplied from the image forming apparatus to inspect; and
    a controller that controls the hardware processor, the reader, and the inspector, wherein,
    in a case where a deviation equal to or greater than a predetermined threshold value is detected at positions of sub-scanning on corresponding images during comparison between the read image and the expected-value image by the inspector, the controller adjusts an OFF period of the sub-scanning image area signals generated by the hardware processor to eliminate a positional deviation of sub-scanning on the corresponding images between the read image and the expected-value image.

2. The image inspection apparatus according to claim 1, wherein
the inspector applies an image process to at least one of the read image and the expected-value image and compares the read image with the expected-value image in a state of the same characteristics or approximate characteristics to inspect.

3. The image inspection apparatus according to claim 1, wherein
the inspector uses marks for position detection which are incorporated in advance at respective corresponding positions on the read image and the expected-value image and compares the read image with the expected-value image to inspect while the marks on these images are matched with each other.

4. The image inspection apparatus according to claim 1, wherein
the inspector extracts corresponding feature points in both the read image and the expected-value image and compares the feature points of these images with each other to inspect.

5. A non-transitory recording medium storing a computer readable image inspection apparatus control program that controls an image inspection apparatus arranged on a downstream side of an image forming apparatus that forms an image on roll paper, the image inspection apparatus comprising:
a hardware processor that is configured to refer to information from the image forming apparatus to set lengths of turning on and off of a plurality of sub-scanning image area signals that determine turning on and off of reading, and generates the sub-scanning image area signals using a leading patch as a trigger for the plurality of sub-scanning image area signals, the leading patch being formed on the roll paper to indicate a start of image formation in the image forming apparatus;
a reader that reads an image formed on the roll paper based on the sub-scanning image area signal;
an inspector that compares a read image generated through reading by the reader with an expected-value image supplied from the image forming apparatus to inspect; and
a controller that controls the hardware processor, the reader, and the inspector,
the non-transitory recording medium storing a computer readable image inspection apparatus control program causing a computer of the image inspection apparatus to function so as to, in a case where a deviation equal to or greater than a predetermined threshold value is detected at positions of sub-scanning on corresponding images during comparison between the read image and the expected-value image by the inspector, adjust an OFF period of the sub-scanning image area signals generated by the hardware processor to eliminate a positional deviation of sub-scanning on the corresponding images between the read image and the expected-value image.

6. The non-transitory recording medium according to claim 5, wherein
the inspector applies an image process to at least one of the read image and the expected-value image and compares the read image with the expected-value image in a state of the same characteristics or approximate characteristics to inspect.

7. The non-transitory recording medium according to claim 5, wherein
the inspector uses marks for position detection which are incorporated in advance at respective corresponding positions on the read image and the expected-value image and compares the read image with the expected-value image to inspect while the marks on these images are matched with each other.

8. The non-transitory recording medium according to claim 5, wherein
the inspector extracts corresponding feature points between the read image and the expected-value image and compares the feature points of these images with each other to inspect.

* * * * *